United States Patent [19]
Ziv et al.

[11] Patent Number: 5,884,187
[45] Date of Patent: Mar. 16, 1999

[54] METHOD AND APPARATUS FOR PROVIDING CENTRALIZED POWER CONTROL ADMINISTRATION FOR A SET OF BASE STATIONS

[76] Inventors: Noam A. Ziv, 10968 Corte Playa Barcelona, San Diego, Calif. 92124; Edward G. Tiedemann, Jr., 4350 Bromfield Ave., San Diego, Calif. 92122

[21] Appl. No.: 614,562

[22] Filed: Mar. 13, 1996

[51] Int. Cl.[6] .............................. H04B 17/00; H04B 7/216
[52] U.S. Cl. ............................ 455/522; 455/69; 455/442; 455/453
[58] Field of Search ................................ 455/69, 522, 88, 455/63, 67.1, 501, 517, 442, 453; 370/208, 342, 441, 485, 500; 375/200, 206

[56] References Cited

U.S. PATENT DOCUMENTS

| | | |
|---|---|---|
| 4,901,307 | 2/1990 | Gilhousen et al. . |
| 5,101,501 | 3/1992 | Gilhousen et al. . |
| 5,109,390 | 4/1992 | Gilhousen et al. . |
| 5,164,958 | 11/1992 | Omura . |
| 5,184,347 | 2/1993 | Farwell et al. . |
| 5,224,120 | 6/1993 | Schilling .................................. 370/342 |
| 5,235,615 | 8/1993 | Omura . |
| 5,267,261 | 11/1993 | Blakeney, II et al. . |
| 5,267,262 | 11/1993 | Wheatley, III . |
| 5,278,892 | 1/1994 | Bolliger et al. . |
| 5,295,153 | 3/1994 | Gudmundson . |
| 5,305,308 | 4/1994 | English et al. . |
| 5,341,397 | 8/1994 | Gudmundson . |
| 5,416,797 | 5/1995 | Gilhousen et al. . |
| 5,438,565 | 8/1995 | Hemmady et al. . |
| 5,499,395 | 3/1996 | Doi et al. ................................ 455/522 |
| 5,574,982 | 11/1996 | Almgren et al. ........................... 455/69 |

FOREIGN PATENT DOCUMENTS

| | | | |
|---|---|---|---|
| 0668664 | 8/1995 | European Pat. Off. ........ | H04B 1/005 |
| 9512297 | 5/1995 | WIPO .............................. | H04Q 7/38 |

OTHER PUBLICATIONS

Tsern–Huei Lee et al., "Downlink Power Control Algorithms for Cellular Radio Systems", IEEE Transactions on Vehicular Technology, vol. 44, No. 1, Feb. 1995, pp. 89–94.

Klein S. Gilhousen et al, "Increased Capacity Using CDMA for Modile Satellite Communication", *IEEE Journal On Selected Areas In Communications*, vol. 8, No. 4, May 1990, pp. 503–514.

TIA Document entitled "CDMA Intersystem Operations" by Alejandro Holcman et al. of Qualsomm Incorporated, Presented at IEEE Conference on Vehicular Technology Committee in Stockholm, Sweden on Jun. 8, 1994, 5 pages.

TIA TR45.2 Intersystems Operations Presentation entitled "The Wideband Spread Spectrum Standard Under Development in TR45.5" by Edward G. Tiedemann, Jr. of Qualcomm Incorporated, presented in Atlanta, Georgia, Nov. 16–20, 1992, 9 pages.

(List continued on next page.)

*Primary Examiner*—Reinhard J. Eisenzopf
*Assistant Examiner*—Lester G. Kincaid
*Attorney, Agent, or Firm*—Russell B. Miller; Bruce W. Greenhaus; Thomas R. Rouse

[57] ABSTRACT

A method and apparatus providing centralized power control in a multiple base station communication configuration. Each base station in a system operates to control both over the forward link power it transmits and the reverse link power from the remote units. A radio link manger provides a common threshold for determining the proper power level of the reverse link signal at each base station. The radio link manager also provides a ratio of the forward link signal strength to a pilot signal strength to control forward link power control. The radio link manager provides the threshold and the ratio uniformly to all base stations thus providing a uniform operating point for all base stations in a system and thus increasing capacity. The same centralized power control is easily expanded to provide a mechanism for intersystem soft handoff.

5 Claims, 6 Drawing Sheets

OTHER PUBLICATIONS

TIA Document entitled "Intersystem Operation With The Proposed Wideband Spread Spectrum Dual–Mode Mobile Station–Base Station Compatibility Standard" by Gadi Karmi et al. of Qualcomm Incorporated, presented May 18, 1992 in Atlanta, Georgia, pp, 1–37.

TIA Document entitled "Alternative Methods For Inter–Channel Handoff" by Charles E. Wheatley, III of Qualcomm Incorporated, presented on Nov. 10–20, 1992 in Atlanta, Georgia, pp. 1–3.

TIA Document entitled "Proposed Draft Liaison Statement to TR45.2" by Edward G. Tiedemann, Jr. of Qualcomm Incorporated presented Dec. 3–11, 1992 in Phoenix, Arizona, pp. 1–32.

TIA Document entitled "Intersystem Issues For Support Of The Wideband Spread–Spectrum Digital Standard" by Gadi Karmi of Qualcomm Incorporated presented Oct. 6, 1992 in Boston, Massachusetts, pp. 1–7.

TIA/EIA Telecommunications Systems Bulletin entitled "Cellular Radiotelecommunications Intersystem Operations: Authentication, Signaling Message Encryption and Voice Privacy", May 1993, 9 pages.

EIA/TIA interim Standard entitled "Cellular Radiotelecommunications Intersystem Operations: Intersystem Handoff", Dec. 1991, 18 pages.

TIA/EIA Telecommunications Systems Bulletin entitled "IS–41–B Mobile Border System Problems", Apr. 1994, 26 pages.

TIA/EIA Telecommunications Systems Bulletin entitled "IS–41–B Support for Dual Mode Wideband Spread Spectrum Mobile Stations", Jan. 1994, 14 pages.

TIA Document entitled "Soft Handoff Frame Format" by Edward G. Tiedemann, Jr. of Qualcomm Incorporated presented Dec. 11–14, 1995 in Dallas, Texas, pp. 1–7.

METHOD AND APPARATUS FOR PROVIDING CENTRALIZED POWER CONTROL ADMINISTRATION FOR A SET OF BASE STATIONS

BACKGROUND OF THE INVENTION

I. Field of the Invention

The present invention relates to communication systems, particularly to a method and apparatus for performing handoff between two sectors of a common base station.

II. Description of the Related Art

In a code division multiple access (CDMA) cellular telephone, wireless local loop or personal communications system, a common frequency band is used for communication with all base stations in a system. The common frequency band allows simultaneous communication between a remote unit and more than one base station. Signals occupying the common frequency band are discriminated at the receiving station through the spread spectrum CDMA waveform properties based on the use of a high speed pseudonoise (PN) code. The high speed PN code is used to modulate signals transmitted from both the base stations and the remote units. Transmitter stations using different PN codes or PN codes that are offset in time produce signals that can be separately received at the receiving station. The high speed PN modulation also allows the receiving station to receive several instances of a common signal from a single transmitting station where the signal has traveled over several distinct propagation paths due to the multipath characteristics of the radio channel or purposefully introduced diversity.

The multipath characteristics of the radio channel create multipath signals that traverse several distinct propagation paths between the transmitting station and the receiving station. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation. For example, if an ideal impulse is transmitted over a multipath channel, each pulse of the received stream of pulses generally has a different signal strength than the other received pulses. Yet another characteristic of the multipath channel is that each path through the channel may cause a different phase on the signal. For example, if an ideal impulse is transmitted over a multipath channel, each pulse of the received stream of pulses generally has a different phase than the other received pulses.

In the radio channel, the multipath is created by reflection of the signal from obstacles in the environment, such as buildings, trees, cars, and people. In general the radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse is transmitted.

The multipath characteristics of a channel can cause signal fading. Fading is the result of the phasing characteristics of the multipath channel. A fade occurs when multipath vectors add destructively, yielding a received signal that is smaller than either individual vector. For example if a sine wave is transmitted through a multipath channel having two paths where the first path has an attenuation factor of X dB (decibels), a time delay of δ with a phase shift of Θ radians, and the second path has an attenuation factor of X dB, a time delay of δ with a phase shift of Θ+π radians, no signal would be received at the output of the channel.

In narrow band modulation systems such as the analog FM modulation employed by conventional radio telephone systems, the existence of multiple path in the radio channel results in severe multipath fading. As noted above with a wideband CDMA, however, the different paths may be discriminated at the receiving station in the demodulation process. The discrimination of multipath signals not only greatly reduces the severity of multipath fading but provides an advantage to the CDMA system.

In an exemplary CDMA system, each base station transmits a pilot signal having a common PN spreading code that is offset in code phase from the pilot signal of other base stations. During system operation, the remote unit is provided with a list of code phase offsets corresponding to neighboring base stations surrounding the base station through which communication is established. The remote unit is equipped with a searching element that allows the remote unit to track the signal strength of the pilot signal from a group of base stations including the neighboring base stations.

A method and system for providing a communication with a remote unit through more than one base station during the handoff process are disclosed in U.S. Pat. No. 5,267,261, entitled "MOBILE ASSISTED SOFT HANDOFF IN A CDMA CELLULAR COMMUNICATION SYSTEM," issued Nov. 30, 1993 assigned to the assignee of the present invention. Using this system, communication between the remote unit and the end user is uninterrupted by the eventual handoff from an original base station to a subsequent base station. This type of handoff may be considered as a "soft" handoff in that communication with the subsequent base station is established before communication with the original base station is terminated. When the remote unit is in communication with two base stations, the remote unit combines the signals received from each base station in the same manner that multipath signals from a common base station are combined.

In a typical macrocellular system, a system controller may be employed to create a single signal for the other end user from the signals received by each base station. Within each base station, signals received from a common remote unit may be combined before they are decoded and thus take full advantage of the multiple signals received. The decoded result from each base station is provided to the system controller. Once a signal has been decoded it cannot be 'combined' with other signals. Thus the system controller must select between the plurality of decoded signals produced by each base station with which communication is established by a single remote unit. The most advantageous decoded signal is selected from the set of signals from the base stations and the other signals are simply discarded.

Remote unit assisted soft handoff operates based on the pilot signal strength of several sets of base stations as measured by the remote unit. The Active Set is the set of base stations through which active communication is established. The Neighbor Set is a set of base stations surrounding an active base station comprising base stations that have a high probability of having a signal strength of sufficient level to establish communication. The Candidate Set is a set of base stations having a pilot signal strength at a sufficient signal level to establish communication.

When communications are initially established, a remote unit communicates through a first base station and the Active Set contains only the first base station. The remote unit monitors the pilot signal strength of the base stations of the Active Set, the Candidate Set, and the Neighbor Set. When a pilot signal of a base station in the Neighbor Set exceeds a predetermined threshold level, the base station is added to the Candidate Set and removed from the Neighbor Set at the remote unit. The remote unit communicates a message to the first base station identifying the new base station. A cellular or personal communication system controller decides whether to establish communication between the new base station and the remote unit. Should the cellular or personal communication system controller decide to do so, the cellular or personal communication system controller sends a message to the new base station with identifying information about the remote unit and a command to establish communications therewith. A message is also transmitted to the remote unit through the first base station. The message identifies a new Active Set that includes the first and the new base stations. The remote unit searches for the new base station transmitted information signal and communication is established with the new base station without termination of communication through the first base station. This process can continue with additional base stations.

When the remote unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the remote unit generates and transmits a message to report the event. The cellular or personal communication system controller receives this message through at least one of the base stations with which the remote unit is communicating. The cellular or personal communication system controller may decide to terminate communications through the base station having a weak pilot signal strength.

The cellular or personal communication system controller upon deciding to terminate communications through a base station generates a message identifying a new Active Set of base stations. The new Active Set does not contain the base station through which communication is to be terminated. The base stations through which communication is established send a message to the remote unit. The cellular or personal communication system controller also communicates information to the base station to terminate communications with the remote unit. The remote unit communications are thus routed only through base stations identified in the new Active Set.

Because the remote unit is communicating with the end user though at least one base station at all times throughout the soft handoff process, no interruption in communication occurs between the remote unit and the end user. A soft handoff provides significant benefits in its inherent "make before break" technique over the conventional "break before make" technique employed in other cellular communication systems.

In a cellular or personal communication telephone system, maximizing the capacity of the system in terms of the number of simultaneous telephone calls that can be handled is extremely important. System capacity in a spread spectrum system can be maximized if the transmission power of each remote unit is controlled such that each transmitted signal arrives at the base station receiver at the same level. In an actual system, each remote unit may transmit the minimum signal level that produces a signal-to-noise ratio that allows acceptable data recovery. If a signal transmitted by a remote unit arrives at the base station receiver at a power level that is too low, the bit-error-rate may be too high to permit high quality communications due to interference from the other remote units. On the other hand, if the remote unit transmitted signal is at a power level that is too high when received at the base station, communication with this particular remote unit is acceptable but this high power signal acts as interference to other remote units. This interference may adversely affect communications with other remote units.

Therefore to maximize capacity in an exemplary CDMA spread spectrum system, the transmit power of each remote unit within the coverage area of a base station is controlled by the base station to produce the same nominal received signal power at the base station. In the ideal case, the total signal power received at the base station is equal to the nominal power received from each remote unit multiplied by the number of remote units transmitting within the coverage area of the base station plus the power received at the base station from remote units in the coverage area of neighboring base stations.

The path loss in the radio channel can be characterized by two separate phenomena: average path loss and fading. The forward link, from the base station to the remote unit, operates on a different frequency than the reverse link, from the remote unit to the base station. However because the forward link and reverse link frequencies are within the same general frequency band, a significant correlation between the average path loss of the two links exists. On the other hand, fading is an independent phenomenon for the forward link and reverse link and varies as a function of time.

In an exemplary CDMA system, each remote unit estimates the path loss of the forward link based on the total power at the input to the remote unit. The total power is the sum of the power from all base stations operating on the same frequency assignment as perceived by the remote unit. From the estimate of the average forward link path loss, the remote unit sets the transmit level of the reverse link signal. Should the reverse link channel for one remote unit suddenly improve compared to the forward link channel for the same remote unit due to independent fading of the two channels, the signal as received at the base station from this remote unit would increase in power. This increase in power causes additional interference to all signals sharing the same frequency assignment. Thus a rapid response of the remote unit transmit power to the sudden improvement in the channel would improve system performance. Therefore it is necessary to have the base station continually contribute to the power control mechanism of the remote unit.

Remote unit transmit power may also be controlled by one or more base stations. Each base station with which the remote unit is in communication measures the received signal strength from the remote unit. The measured signal strength is compared to a desired signal strength level for that particular remote unit. A power adjustment command is generated by each base station and sent to the remote unit on the forward link. In response to the base station power adjustment command, the remote unit increases or decreases the remote unit transmit power by a predetermined amount. By this method, a rapid response to a change in the channel is effected and the average system performance is improved. Note that in a typical cellular system, the base stations are not intimately connected and each base station in the system is unaware of the power level at which the other base stations receive the remote unit's signal.

When a remote unit is in communication with more than one base station, power adjustment commands are provided from each base station. The remote unit acts upon these multiple base station power adjustment commands to avoid transmit power levels that may adversely interfere with other remote unit communications and yet provide sufficient power to support communication from the remote unit to at least one of the base stations. This power control mechanism is accomplished by having the remote unit increase its transmit signal level only if every base station with which the remote unit is in communication requests an increase in power level. The remote unit decreases its transmit signal level if any base station with which the remote unit is in communication requests that the power be decreased. A system for base station and remote unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention.

Base station diversity at the remote unit is an important consideration in the soft handoff process. The power control method described above operates optimally when the remote unit communicates with each base station through which communication is possible. In doing so, the remote unit avoids inadvertently interfering with communications through a base station receiving the remote unit's signal at an excessive level but unable to communicate a power adjustment command to the remote unit because communication is not established therewith.

A typical cellular or personal communication system contains some base stations having multiple sectors. A multi-sectored base station comprises multiple independent transmit and receive antennas. The process of simultaneous communication with two sectors of the same base station is called softer handoff. The process of soft handoff and the process of softer handoff are the same from the remote unit's perspective. However the base station operation in softer handoff is different from soft handoff. When a remote unit is communicating with two sectors of the same base station, the demodulated data signals of both sectors are available for combination within the base station before the signals are passed to the cellular or personal communication system controller. Because the two sectors of a common base station share circuitry and controlling functions, a variety of information is readily available to sectors of a common base station that is not available between independent base stations. Also two sectors of a common base station send the same power control information to a remote unit (as discussed below).

The combination process in softer handoff allows demodulated data from different sectors to be combined before decoding and thus produce a single soft decision output value. The combination process can be performed based on the relative signal level of each signal thus providing the most reliable combination process.

As noted above, the base station can receive multiple instances of the same remote unit signal. Each demodulated instance of the arriving signal is assigned to a demodulation element. The demodulated output of the demodulation element is combined. The combined signal is decoded. The demodulation elements, instead of being assigned to a single sector, may be assigned to a signal from any one of a set of sectors in the base station. Thus, the base station may use it resources with high efficiency by assigning demodulation elements to the strongest signals available.

Combining signals from sectors of a common base station also allows a sectorized base station to make a single power adjustment command for remote unit power control. Thus the power adjustment command from each sector of a common base station is the same. This uniformity in power control allows flexible handoff operation in that sector diversity at the remote unit is not critical to the power control process. Further details of the softer handoff process are disclosed in U.S. Patent entitled "METHOD AND APPARATUS FOR PERFORMING HANDOFF BETWEEN SECTORS OF A COMMON BASE STATION," issued Apr. 29, 1997, assigned to the assignee of the present invention. Further information on the benefits and application of softer handoff are disclosed in U.S. patent application Ser. No. 08/144,901, filed Oct. 30, 1993, entitled "METHOD AND APPARATUS FOR REDUCING THE AVERAGE TRANSMIT POWER FROM A SECTORIZED BASE STATION" and U.S. patent application Ser. No. 08/316,155, filed Sep. 30, 1994 entitled "METHOD AND APPARATUS FOR REDUCING THE AVERAGE TRANSMIT POWER OF A BASE STATION" each of which is assigned to the assignee of the present invention.

Each base station in the cellular system has a forward link coverage area and a reverse link coverage area. These coverage areas define the physical boundary beyond which base station communication with a remote unit is degraded. In other words, if a remote unit is within the base station's coverage area, the remote unit can communicate with the base station, but if the remote unit is beyond the coverage area, communications are compromised. A base station may have single or multiple sectors. Single sectored base stations have approximately a circular coverage area. Multi-sectored base stations have independent coverage areas that form lobes radiating from the base station.

Base station coverage areas have two handoff boundaries. A handoff boundary is defined as the physical location between two base stations where the link would perform the same regardless of whether the remote unit is communicating with the first or second base station. Each base station has a forward link handoff boundary and a reverse link handoff boundary. The forward link handoff boundary is defined as the location where the remote unit's receiver would perform the same regardless of which base station it was receiving. The reverse link handoff boundary is defined as the location of the remote unit where two base station receivers would perform the same with respect to that remote unit.

Ideally these boundaries should be balanced, meaning that they should have the same physical location. If they are not balanced, system capacity may be reduced as the power control process is disturbed or the handoff region unreasonably expands. Note that handoff boundary balance is a function of time, in that the reverse link coverage area shrinks as the number of remote units present therein increases. Reverse link power, which increases with each additional remote unit, is inversely proportional to the reverse link coverage area. An increase in receive power decreases the effective size of the reverse link coverage area of the base station and causes the reverse link handoff boundary to move inward toward the base station.

To obtain high performance in a CDMA or other cellular system, it is important to carefully and accurately control the transmit power level of the base stations and remote units in the system. Transmit power control limits the amount of self-interference produced by the system. Moreover, on the forward link, a precise level of transmit power can serve to balance the forward and reverse link handoff boundaries of a base station or a single sector of a multi-sectored base station. Such balancing helps to reduce the size of the handoff regions, increase overall system capacity, and improve remote unit performance in the handoff region.

Before adding a new base station to the existing network, the forward link (i.e., transmit) power and the reverse link (i.e., receive) signal power of the new base station are both approximately equal to zero. To begin the process of adding the new base station, an attenuator in the receive path of the new base station is set to a high attenuation level, creating a high level of artificial noise receive power. An attenuator in the transmit path is also set to a high attenuation level, which in turn causes a low transmit power level. The high level of artificial noise receive power results in the reverse link coverage area of the new base station being very small. Similarly, because the forward link coverage area is directly proportional to the transmit power, the very low transmit power level and the forward link coverage area is also very small.

The process then continues by adjusting the attenuators in the receive and transmit paths in unison. The attenuation level of the attenuator in the receive path is decreased, thereby decreasing the level of artificial noise receive power, increasing the natural signal level, and hence increasing the size of the reverse link coverage area. The attenuation level of the transmit path attenuator is also decreased, thereby increasing the transmit power level of the new base station and expanding its forward link coverage area. The rate at which the transmit power is increased and the artificial noise receive power is decreased must be sufficiently slow to permit handoff of calls between the new and surrounding base stations as the new base station is added to or removed from the system.

Each base station in the system is initially calibrated such that the sum of the unloaded receiver path noise measured in decibels and the desired pilot power measured in decibels is equal to some constant. The calibration constant is consistent throughout the system of base stations. As the system becomes loaded (i.e., remote units begin to communicate with the base stations), a compensation network maintains the constant relationship between the reverse link power received at the base station and the pilot power transmitted from the base station. The loading of a base station effectively moves the reverse link handoff boundary closer in toward the base station. Therefore to imitate the same effect on the forward link, the pilot power is decreased as loading is increased. The process of balancing the forward link handoff boundary to the reverse link handoff boundary is referred to as base station breathing is detailed in U.S. Pat. No. 5,548,812 entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM" issued Aug. 20, 1996 and assigned to the assignee of the present invention. The process of balancing the forward link handoff boundary to the reverse link handoff boundary during the addition or removal of a base station from a system is referred to as base station blossoming and wilting is detailed in U.S. Pat. No. 5,475,870 entitled "APPARATUS AND METHOD FOR ADDING AND REMOVING A BASE STATION FROM A CELLULAR COMMUNICATION SYSTEM" issued Dec. 12, 1995 and assigned to the assignee of the present invention.

It is desirable to control the relative power used in each forward link signal transmitted by the base station in response to control information transmitted by each remote unit. The primary reason for providing such control is to accommodate the fact that in certain locations the forward link may be unusually disadvantaged. Unless the power being transmitted to the disadvantaged remote unit is increased, the signal quality may become unacceptable. An example of such a location is a point where the path loss to one or two neighboring base stations is nearly the same as the path loss to the base station communicating with the remote unit. In such a location, the total interference would be increased by three times over the interference seen by a remote unit at a point relatively close to its base station. In addition, the interference coming from the neighboring base stations does not fade in unison with the signal from the active base station as would be the case for interference coming from the active base station. A remote unit in such a situation may require 3 to 4 dB of additional signal power from the active base station to achieve adequate performance.

At other times, the remote unit may be located where the signal-to-interference ratio is unusually good. In such a case, the base station could transmit the corresponding forward link signal using a lower than nominal transmitter power, reducing interference to other signals being transmitted by the system.

To achieve the above objectives, a signal-to-interference measurement capability can be provided within the remote unit receiver. A signal-to-interference measurement is performed by comparing the power of the desired signal to the total interference and noise power. If the measured ratio is less than a predetermined value, the remote unit transmits a request to the base station for additional power on the forward link. If the ratio exceeds the predetermined value, the remote unit transmits a request for power reduction. One method by which the remote unit receiver can monitor signal-to-interference ratios is by monitoring the frame error rate (FER) of the resulting signal.

The base station receives the power adjustment requests from each remote unit and responds by adjusting the power allocated to the corresponding forward link signal by a predetermined amount. The adjustment would usually be small, typically on the order of 0.5 to 1.0 dB, or around 12%. The rate of change of power may be somewhat slower than that used for the reverse link, perhaps once per second. In the preferred embodiment, the dynamic range of the forward link adjustment is typically limited such as from 4 dB less than nominal to about 6 dB greater than nominal transmit power.

CDMA base stations have the ability to provide accurate control over the power level at which they transmit. To provide accurate power control, it is necessary to compensate for variations in the gain in the various components comprising the transmit chain of the base station. Variations in the gain typically occur over temperature and aging such that a simple calibration procedure at deployment does not guarantee a precise level of output transmit power over time. Variations in the gain can be compensated by adjusting the overall gain in the transmit chain so that the actual transmit power of the base station matches a calculated desired transmit power. Each base station sector produces several signaling channels that operate at a variety of data rates and relative signal levels that combined create a raw radio frequency transmit signal. The channel element modulators, each of which corresponds to a channel, calculate the expected power of each channel signal. The base station also comprises a base station transceiver system controller (BTSC) which generates a desired output power of the sector by summing the expected powers of each channel.

As noted above, a typical cellular system is comprised of a plurality of spaced apart base stations each having a set of associated collocated antennas. A typical cellular base station may be comprised of three or more sectors. The sectors are subdivisions of the base station that are intimately related. Each sector transmits a different set of signals than the set of signals transmitted by every other sector in the base station. Because the sector circuitry is collocated, it may be easily shared and interconnected between the sectors. The antenna pattern of a typical three sectored base station is shown in FIG. 1. In FIG. 1 coverage area 300A is represented by the finest width line. Coverage area 300B is represented by the medium width line. Coverage area 300C is represented by the heaviest line. The shape of the three coverage areas shown in FIG. 1 is the shape produced by standard directional dipole antennas. The edges of the coverage areas can be thought of as the location at which a remote unit receives the minimum signal level necessary to support communication through that sector. As a remote unit moves into the sector, the signal strength received from the base station as perceived by the remote unit increases. A remote unit at point 302 may communicate through sector 300A. A remote unit at point 303 may communicate through sector 300A and sector 300B. A remote unit at point 304 communicates through sector 300B. As a remote unit moves past the edge of the sector, communication through that sector may degrade. A remote unit operating in soft handoff mode between the base station in FIG. 1 and an unshown neighboring base station is likely to be located near the edge of one of the sectors.

FIG. 2 illustrates an exemplary embodiment of a standard cellular system showing three single sectored base stations 362, 364, and 368. In FIG. 2, each of antennas 310, 326, and 344 is the receive antenna for base station 362, 364, or 368 respectively. Base stations 362, 364, and 368 are in proximity to one another and antennas 310, 326, and 344 have overlapping coverage areas such that a single remote unit signal may be in soft handoff with all three base stations at one time.

Antennas 310, 326, and 344 supply a receive signal to receive processings 312, 328, and 346 respectively. Receive processings 312, 328, and 346 process the RF signal and convert the signal to digital bits. Receive processings 312, 328, and 346 may also filter the digital bits. Receive processing 312 provides the filtered digital bits to demodulation elements 316A–316N. Receive processing 328 provides the filtered digital bits to demodulation elements 332A–332N. Likewise, receive processing 346 provides the filtered digital bits to demodulation elements 350A–350N.

Demodulation elements 316A–316N are controlled by controller 318 through interconnection 320. Controller 318 assigns demodulation elements 316A–316N to one of the instances of information signal from the same remote unit as perceived by base station 362. The distinct instances of the signal may be created due to the multipath characteristics of the environment. Demodulation elements 316A–316N produce data bits 322A–322N that are combined in symbol combiner 324. The output of symbol combiner 324 may be aggregate soft decision data suitable for Viterbi decoding. The combined data is decoded by decoder 314 and output as Message 1 and passed to cellular or personal communications system controller 370.

A power adjustment command from base station 362 for the remote unit is created by controller 318 from the combined signal strength of all the signals demodulated by demodulation elements 316A–316N. Controller 318 can pass the power control information to the transmit circuitry (not shown) of base station 362 to be relayed to the remote unit.

Demodulation elements 332A–332N are controlled by controller 334 through interconnection 336. Controller 334 assigns demodulation elements 332A–332N to one of the instances of information signals from the same remote unit. Demodulation elements 332A–332N produce data bits 338A–338N that are combined in symbol combiner 340. The output of symbol combiner 340 may be aggregate soft decision data suitable for Viterbi decoding. The combined data is decoded by decoder 342 and output as Message 2 and passed to cellular or personal communications system controller 370.

A power adjustment command for the remote unit is created by controller 334 from the combined signal strength of all the signals demodulated by demodulation elements 332A–332N. Controller 334 can pass the power control information to the transmit circuitry (not shown) of base station 364 to be relayed to the remote unit.

Demodulation elements 350A–350N are controlled by controller 352 through interconnection 354. Controller 352 assigns demodulation elements 350A–350N to one of the instances of information signals from the same remote unit as perceived by base station 368. Demodulation elements 350A–350N produce data bits 356A–356N that are combined in symbol combiner 358. The output of symbol combiner may be aggregate soft decision data suitable for Viterbi decoding. The combined data is decoded by decoder 360 and the output as Message 3 and passed to cellular or personal communications system controller 370.

A power adjustment command for the remote unit is created by controller 352 from the estimated signal strengths of all the signals demodulated by demodulation elements 350A–350N. Controller 352 can pass the power control information to the transmit circuitry (not shown) of base station 368 to be relayed to the remote unit.

For each remote unit operating in soft handoff in the system, cellular or personal communication system controller 370 receives decoded data from at least two base stations. For example, in FIG. 2 cellular or personal communications system controller 370 receives decoded data in the form of Messages 1, 2, and 3 from the common remote unit from base stations 362, 364, and 368 respectively. The decoded data cannot be combined to yield the great advantage that is achieved by combining the data prior to decoding. Therefore typically cellular or personal communication system controller 370 does not combine the decoded data from each base station and instead selects one of the three decoded data Messages 1, 2, or 3 having the highest signal quality index and discards the other two. In FIG. 2 selector 372 performs the selection process on a frame by frame basis and provides the result to a vocoder or other data processing unit. More information about the selection process can be found in co-pending U.S. patent application Ser. No. 08/519,670 entitled "COMMUNICATION SYSTEM USING REPEATED DATA SELECTION" filed Aug. 25, 1995 and assigned to the assignee of the present invention.

The reason the combined but undecoded data output from symbol combiners 324, 340, and 358 is not sent respectively from base stations 362, 364, and 368 to system controller 370 is that the demodulation process produces data at a very high rate. A large block of data is used in the decoding process to produce the decoded symbol. The ratio of the amount of data necessary to decode a data symbol and the amount of data to specify a decoded symbol and quality index can be as high as 1000 to 1. In addition to the complexity, the inherent delay of transporting such large amounts of data is prohibitive unless a very high speed link is used. Thus the interconnection system between the hundreds of base stations in the system (most of which are not shown in FIG. 2) and system controller 370 is greatly simplified by sending only the decoded data and quality indications instead of the undecoded data suitable for combination.

Besides the complexity of transmitting the large amount of data associated with combined but undecoded data, the cost is also prohibitive. Typically the base stations of a system are remotely located from the system controller. The path from the base stations to the system control typically comprises a leased line such as a T1 interface line. The cost of these lines is largely determined by the amount of data that they carry. Thus increasing the amount of data that is transmitted from the base stations to the system controller can be cost prohibitive as well as technically difficult.

In a less than optimal system the selection method of soft handoff described with respect to FIG. 2 could be directly applied to a sectorized base station by treating each sector of a common base station as a separate, independent base station. Each sector of the base station could combine and decode multipath signals from a common remote unit. The decoded data could be sent directly to the cellular or personal communication system controller by each sector of the base station or it could be compared and selected at the base station and the result sent to the cellular or personal communication system controller. But a much more advantageous method of handling handoff between sectors of a common base station is to use softer handoff as described in the above mentioned U.S. Pat. No. 5,625,876. Circuitry for providing softer handoff is described in conjunction with FIG. 3.

In FIG. 3, each of antennas 222A–222C is the receive antenna for one sector and each of antennas 230A–230C is the transmit antenna for one sector. Antenna 222A and antenna 230A correspond to a common coverage area and can ideally have the same antenna pattern. Likewise antennas 222B and 230B, and antennas 222C and 230C correspond to common coverage areas respectfully. FIG. 3 represents a typical base station in that antennas 222A–222C have overlapping coverage areas such that a single remote unit signal may be present at more than one antenna at a time. Antennas 222A–222C may provide antenna patterns as shown in FIG. 1 or one or more of antennas 222A–222C may be distributed antennas.

Referring again to FIG. 3, antennas 222A, 222B, and 222C supply the received signal to receive processings 224A, 224B, and 224C respectively. Receive processings 224A, 224B, and 224C process the RF signal and convert the signal to digital bits. Receive processings 224A, 224B, and 224C may filter the digital bits and provide the resulting digital bits to interface port 226. Interface port 226 may connect any of the three incoming signal paths to any of the demodulation elements 204A–204N under the control of controller 200 through interconnection 212.

Demodulation elements 204A–204N are controlled by controller 200 through interconnection 212. Controller 200 assigns demodulation elements 204A–204N to one of the instances of information signals from a single remote unit from any one of the sectors. Demodulation elements 204A–204N produce data bits 220A–220N each representing an estimate of the data from the single remote unit. Data bits 220A–220N are combined in symbol combiner 208 to produce a single estimate of the data from the remote unit. The output of symbol combiner 208 may be aggregate soft decision data suitable for Viterbi decoding. The combined symbols are passed to decoder 228.

Demodulation elements 204A–204N also provide several output control signals to controller 200 through interconnection 212. The information passed to controller 200 includes an estimate of the signal strength of the signal assigned to a particular demodulation element. Each one of demodulation elements 204A–204N measures a signal strength estimation of the signal that it is demodulating and provides the estimation to controller 200.

Notice that symbol combiner 208 can combine signals from just one sector to produce an output or it can combine symbols from multiple sectors as selected by the interface port 226. A single power control command is created by controller 200 from the estimated signal strengths from all the sectors through which the signal is received. Controller 200 can pass the power control information to the transmit circuitry of each sector of the base station. Thus each sector in the base station transmits the same power control information to a single remote unit.

When symbol combiner 208 is combining signals from a remote unit that is communicating through more than one sector, the remote unit is in softer handoff. The base station may send the output of decoder 228 to a cellular or personal communication system controller. At the cellular or personal communication system controller, signals corresponding to the remote unit from this base station and from other base stations may be used to produce a single output using the selection process described above.

The transmit processing shown in FIG. 3 receives a message for a remote unit from the end user through the cellular or personal communication system controller. The message can be sent on one or more of antennas 230A–230C. Interface port 236 connects the message for the remote unit to one or more of modulation elements 234A–234C as set by controller 200. Modulation elements 234A–234C modulate the message for the remote unit with the appropriate PN code. The modulated data from modulation elements 234A–234C is passed to transmit processing 232A–232C respectively. Transmit processings 232A–232C convert the message to an RF frequency and transmit the signal at an appropriate signal level through antennas 230A–230C respectively. Notice that interface port 236 and interface port 226 operate independently in that receiving a signal from a particular remote unit through one of antennas 222A–222C does not necessarily mean that the corresponding transmit antenna 230A–230C is transmitting a signal to the particular remote unit. Also note that the power control command sent through each antenna is the same, thus sector diversity from a common base station is not critical for the optimal power control performance. These advantages are further exploited to the advantage of the system in the above mentioned U.S. patent application Ser. Nos. 08/144,901 and 08/316,155 through a process referred to as transmit gating.

Besides the complexities of power control noted above, the process of power control becomes more complicated when soft handoff between two or more base station is attempted when the two base stations are controlled by different switches. The process of breathing also complicates traditional power control mechanism. The present invention is a method and apparatus for providing power control administration through a set of base stations that are breathing and that may be controlled by a different switch.

SUMMARY OF THE INVENTION

A centralized power control method and apparatus provides centrally controlled power control to a set of base stations. The centrally controlled power control is controlled by the radio link manager (RLM). Each base station with which a remote unit has established a traffic channel sends a packet corresponding to each reverse traffic frame to a selector. For each frame, the packet comprises an erasure indication bit (EIB) when available that indicates whether the last forward link frame received by the remote unit was decoded as an erasure. The RLM executes the forward link power control calculation system and produces one result per frame. The result per frame is the desired ratio of the traffic channel gain to the pilot channel gain, $G_{Tc}/G_{pilot}$. The resultant ratio is transmitted to all base stations having established communication with the remote unit.

The present invention also centralizes the administration of the reverse link power control. In the preferred embodiment, the RLM calculates an aggregate frame error rate (FER) at the output of the selection process. The RLM calculates the absolute reverse threshold value then forwards it to each base station with which active communication with the remote unit is established. The reverse threshold value can be forwarded on a frame by frame basis.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 4:
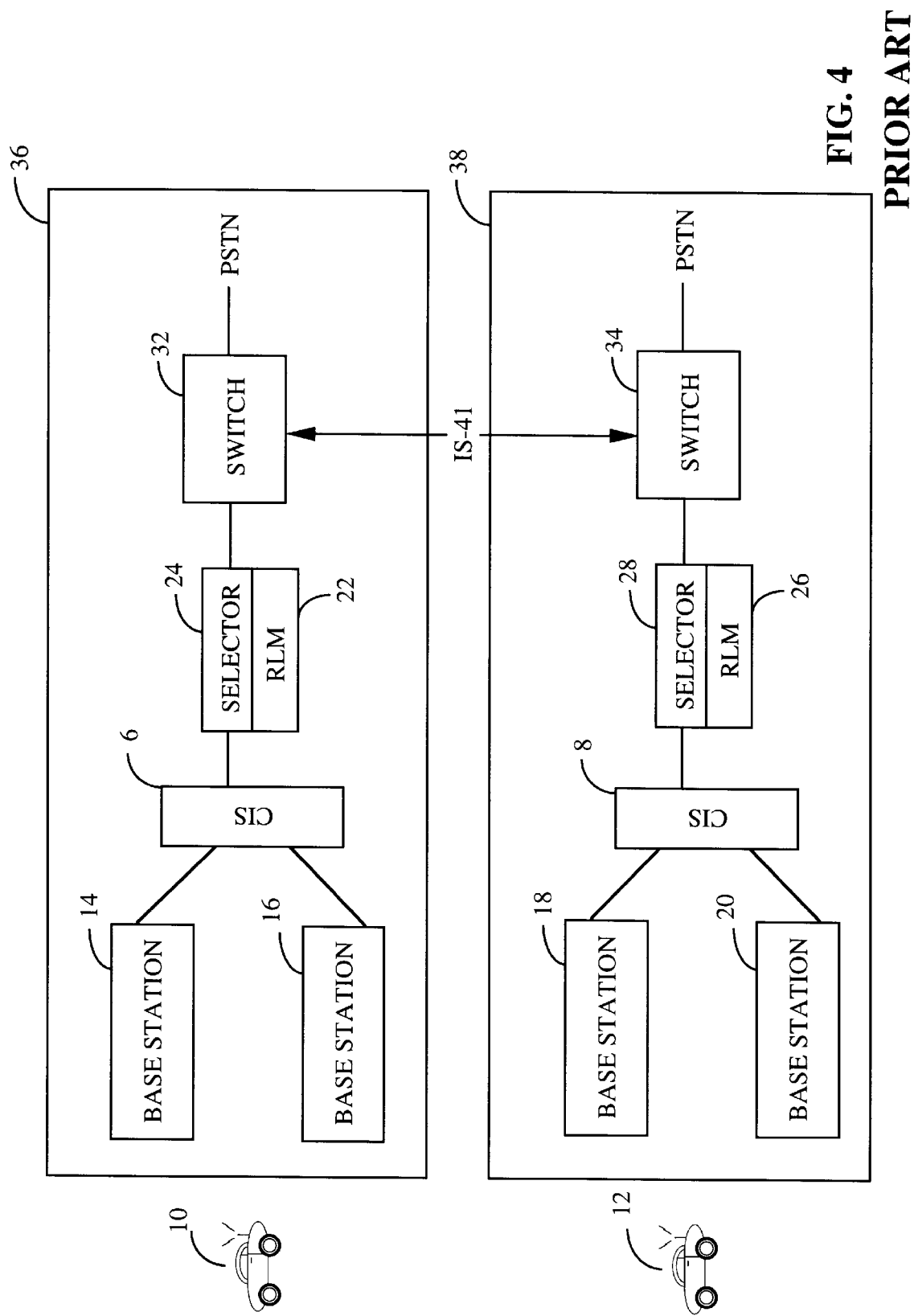
FIG. 4 shows an exemplary CDMA communication system comprised of two different operating regions each controlled by a different switch.

FIG. 4 shows an exemplary wireless code division multiple access (CDMA) communication system comprised of two different operating regions each controlled by a different switch. Operating region 36 is controlled by switch 32 that connects the wireless communication system with the public switch telephone network (PSTN). Operating region 38 is controlled by switch 34 that connects the wireless communication system with the public switch telephone network (PSTN). Operating region 36 is comprised of a number of base stations only two of which are shown in FIG. 4 as base stations 14 and 16. CDMA interconnect subsystem (CIS) 6 provides an interconnect mechanism between the base stations of operating region 36 and a bank of selectors as well as other devices that are not shown in FIG. 4. In particular CIS 6 provides a connection between the base stations that may establish connection with remote unit 10 and selector 24 that processes the call signal corresponding to remote unit 10.

When remote unit 10 has established an active traffic channel communication link through only base station 14, base station 14 passes decoded frame data to selector 24 through CIS 6. Selector 24 comprises a vocoder that converts the vocoded frames into pulse code modulated (PCM) data and passes the PCM data to switch 32. The data packets arriving from base station 14 at selector 24 may also comprise information about the radio wireless link between base station 14 and remote unit 10. Selector 24 passes information about the wireless link to radio link manager (RLM) 22.

PCM encoded data from the PSTN intended for remote unit 10 is passed from switch 32 to selector 24. The PCM data is converted to vocoder frame data by selector 24. The vocoded frames are passed to base station 14 though CIS 6. RLM 22 may append control data to the vocoded frames. Remote unit 10 may be a vehicle based telephone, a hand-held portable unit, a PCS unit, or a fixed location wireless local loop unit or any other conforming voice or data communication device.

Within operating region 36, RLM 22 controls the air interface of the wireless link between remote unit 10 and whichever base stations have established active communication with remote unit 10. In the present invention, one of the main functions of RLM 22 is to control the operation of both the forward and reverse link power control functions. Forward link power control operates by controlling the level at which the base stations transmit the forward link traffic channel signal to the remote unit based on the forward link performance as measured by the remote unit. Reverse link power control operates by controlling the level at which the remote unit transmits the reverse link traffic channel signal to the base station based on the reverse link performance.

The remote unit may measure the forward link performance by any one of several methods such as by issuing periodic measurement of a bit energy to noise power density (Eb/No) or by sending a message each time the number of frames decoded as an erasure exceeds a threshold. In the preferred embodiment, the forward link power control information from the remote unit is in accordance with "Mobile Station-Base Station Compatibility Standard for Dual-Mode Wideband Spread Spectrum Cellular System," TIA/EIA/IS-95, generally referred to simply as IS-95. In IS-95 the remote unit is referred to as a mobile station.

Under IS-95, when the base station enables forward traffic channel power control, the remote unit reports frame error rate (FER) statistics to the base station using a Power Measurement Report Message. The base station may enable periodic reporting that causes the remote unit to report frame error rate statistics at specified intervals. The base station may also enable threshold reporting which causes the remote unit to report frame error rate statistics when the frame error rate reaches a specified threshold. According to IS-95 at section 7.6.4.1.1, the base station may use the reported frame error rate statistics to adjust the transmit power on the forward traffic channel. The notable fact is that IS-95 does not specify the manner in which the base station operates the forward link power control based on the frame error rates therefore individual manufactures of base station equipment are free to design different methods for controlling the forward link power control.

In the preferred embodiment, the forward link power control information from the remote unit may also be in accordance with "Personal Station-Base Station Compatibility Requirements for 1.8 to 2.0 GHz Code Division Multiple Access (CDMA) Personal Communication Systems" ANSI J-STD-008, generally referred to as J-Standard 8, or in accordance with "Mobile Station-Base Station Compatibility Standard for Dual-Mode Wideband Spread Spectrum Cellular Systems+Telecommunication Systems Bulletin: Support for 14.4 kbps Data Rate and PCS Interaction for Wideband Spread Spectrum Cellular Systems" TIA/EIA/IS-95-A+TSB74, generally referred to simply as IS-95-A. In IS-95A, the remote unit is referred to as a mobile station. In J-Standard 8, the remote unit is referred as a personal station.

Under IS-95-A and J-Standard 8, the remote unit may operate in one of two modes. The first mode is based on the operation of the remote unit under the IS-95 standard and is referred to as rate set 1. The second form of operation is based on operation at a different set of data rates and is referred to as the rate set 2. The rate set 2 data rates are higher than the rate set 1 data rates. When the remote unit is operating in rate set 2, each frame transmitted on the reverse link comprises an Erasure Indicator Bit (EIB). The EIB is set to '1' following reception of a forward link frame that is decoded as an erasure. In all other cases the EIB is set to '0.' Table I shows the number of information bits per frame for the four possible data rates of each of the two rate sets. An erasure on the reverse traffic channel provides no information bits.

TABLE I

| Rate Set | Data Rate Name | Transmission Rate (bps) | Information bits/frame |
|---|---|---|---|
| 1 | full | 9600 | 172 |
|   | half | 4800 | 80 |
|   | quarter | 2400 | 40 |
|   | eighth | 1200 | 16 |
| 2 | full | 14400 | 267 |
|   | half | 7200 | 125 |
|   | quarter | 3600 | 55 |
|   | eighth | 1800 | 21 |

In a common prior art mechanism for controlling the forward link power level, each base station determines the absolute value of the forward link power level of each traffic channel signal individually without reference to the level used by the other base stations with which the remote unit may be in communication. A typical system in the prior art configuration compares the FER reported by the remote unit to a threshold and updates the power level of the corresponding traffic channel signal such that the FER remains slightly above the threshold.

Typically in the prior art configuration, the radio link manager such as RLM 22 of FIG. 4 has control of the threshold value. Thus if a remote 'super user' is guaranteed lower FER than other system users, the threshold can be changed by sending a message from the radio link manager to each base station that has established communication with the remote unit.

Figure 1:
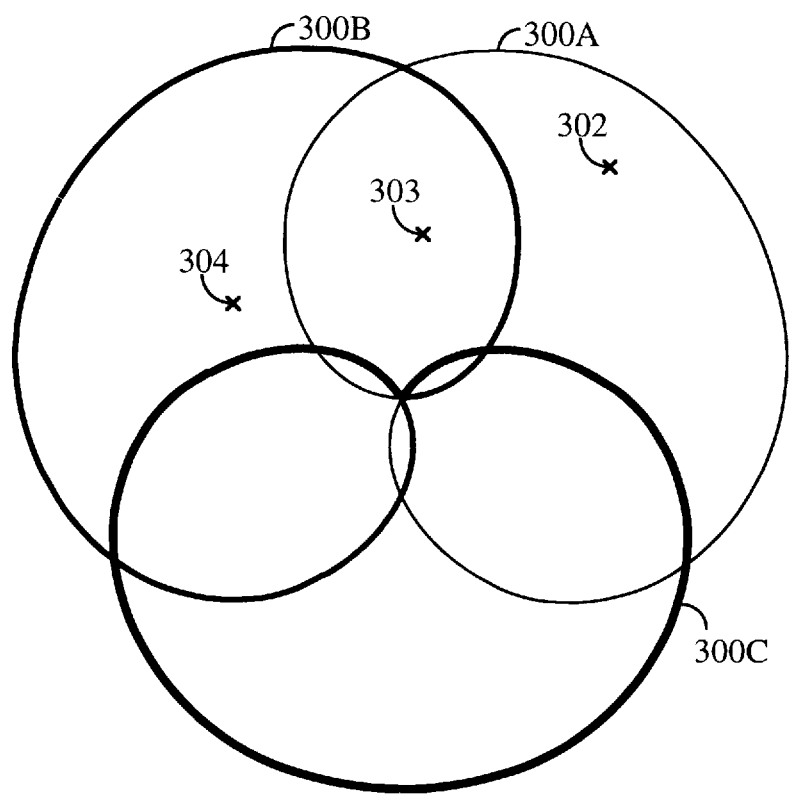
FIG. 1 shows an antenna pattern of a typical three sectored base station.
Figure 2:
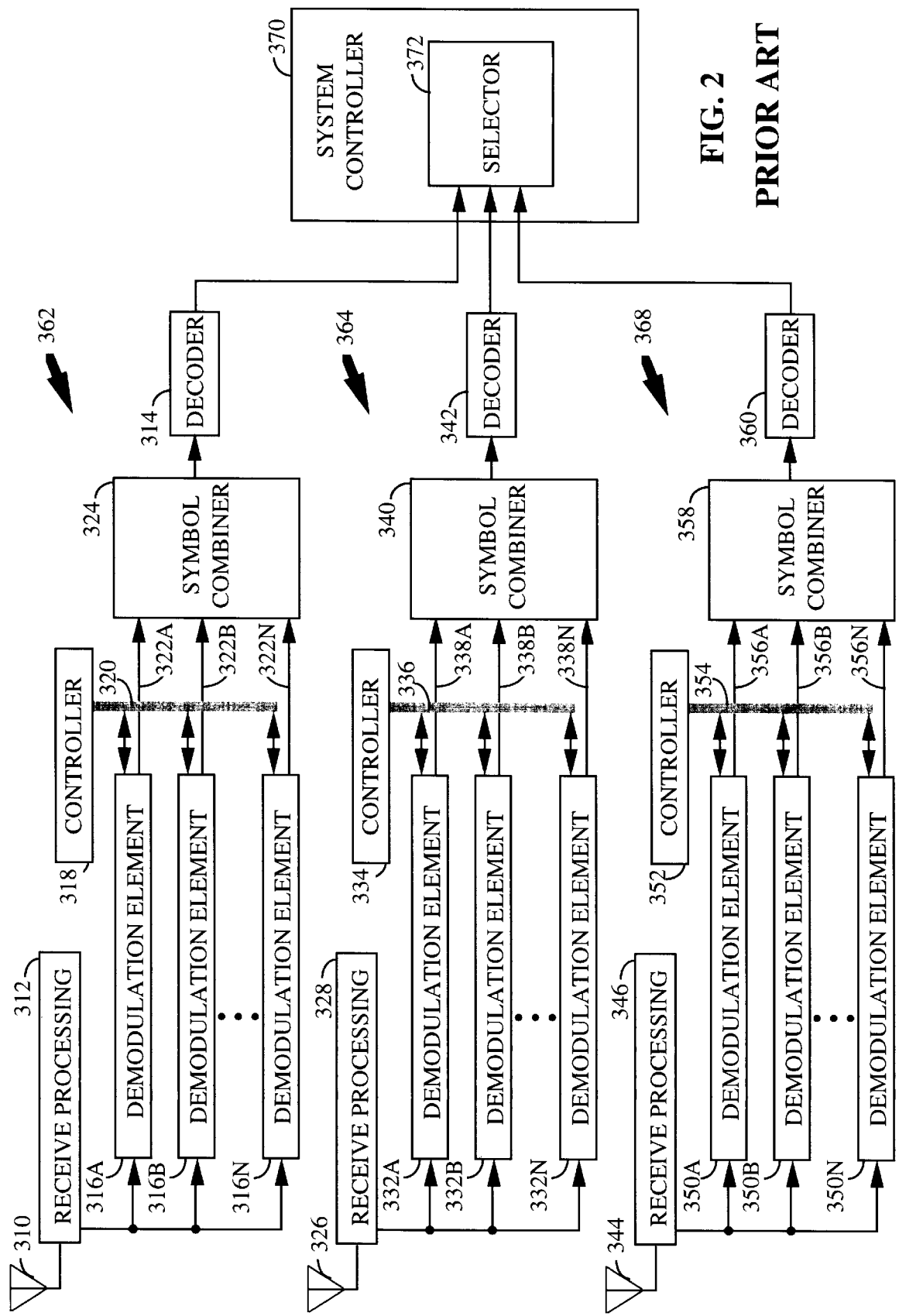
FIG. 2 illustrates an exemplary embodiment of a standard cellular system showing three single sectored base stations.
Figure 3:
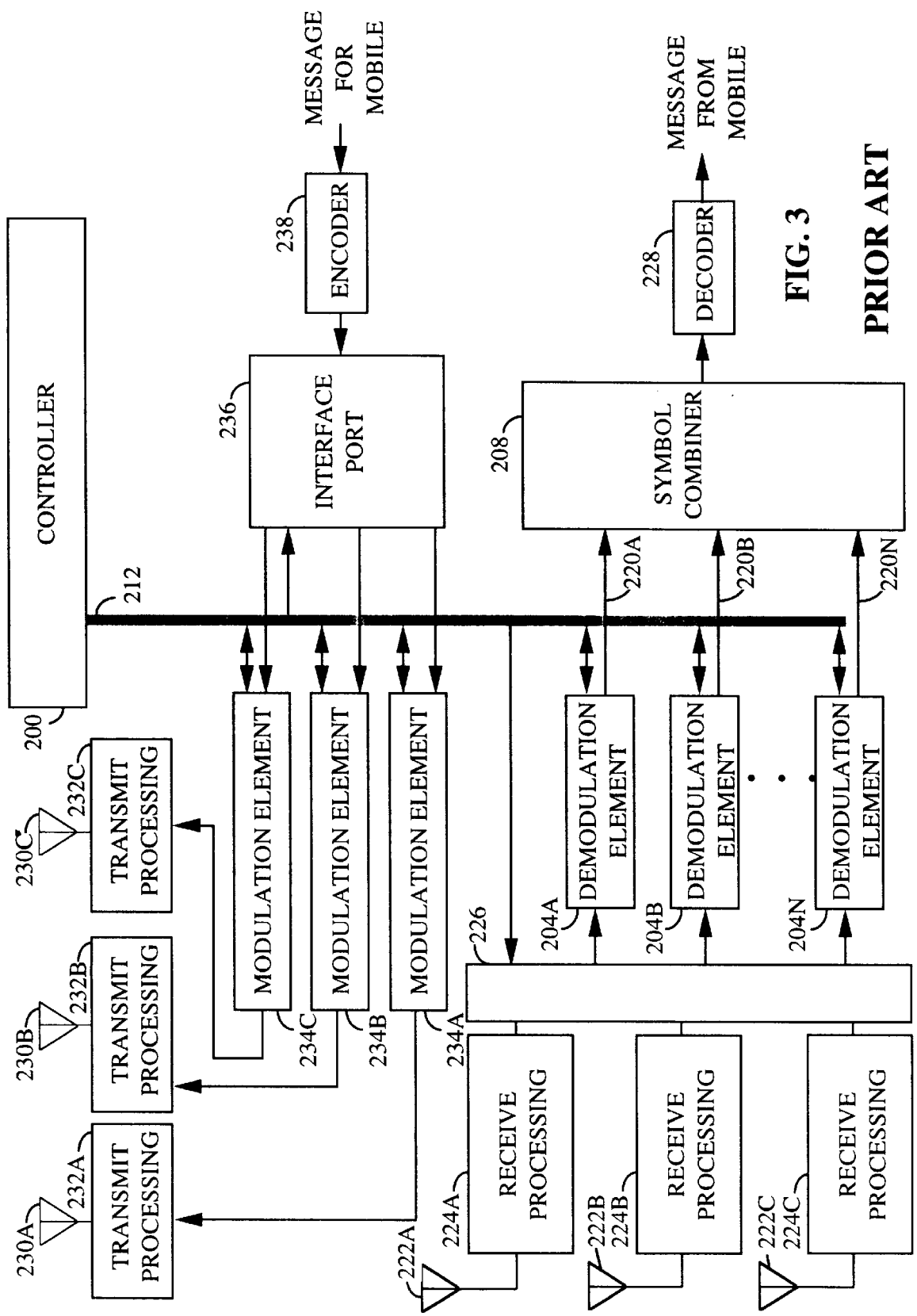
FIG. 3 illustrates an exemplary embodiment of a three sectored base station of a standard cellular system.

Note that when the remote unit is in handoff, it measures the FER based on the total aggregate signal created from combining a number of multipath signals from a plurality of base stations in a manner very similar to the manner described in relation to a sector of a base station in FIG. 2. The difference between the base station demodulation and decoding operation and the remote unit demodulation and decoding operation is that the remote unit receives signals from two different sources during handoff while the base station simply receives a plurality of multipath signal propagations from the same remote unit whether or not the remote unit is in handoff. The remote unit combines the output of the demodulation elements based on the relative signal strength of the pilot signals corresponding to each multipath instance of the signal regardless of which base station provided the signal. Thus under IS-95 the remote unit makes one FER measurement based on the aggregate decoded signal and transmits the FER measurement to each base station with which the remote unit is in communication. Under IS-95-A and J-Standard 8, the remote unit may simply send the EIB with each frame based on the aggregate signal rather than the FER measurement.

Each base station with which the remote unit is in communication compares the FER to a threshold and either raises, lowers, or leaves unaltered the transmit power level of the corresponding forward link traffic channel. Note the disadvantage of such a system. Even though each base station may be using the same method of calculation and the same threshold, two base stations equally advantageously positioned to service the remote unit may be transmitting the signal to the remote unit at different levels. The different levels result because the absolute power level of the output of each base station depends on the initial value at which the system of calculation begins operation. As the remote unit travels through the operating region, handoffs begin at random intervals and the initial absolute value of the traffic channel power level of a newly added base station is not tied in any way to the traffic channel power level used by the other base stations with which the remote unit is already in communication. Suppose the remote unit is already operating at the proper FER when the new base station is added. If the initial traffic channel power level of the newly added base station is low, the effect of the signal power of the newly added base station on the FER at the remote unit is minimal. Because the FER at the remote unit is already acceptable, the transmit power from the newly added base station remains at the initial value. Thus if the original base station is equally advantageously positioned relative to the newly added base station and the original base station is transmitting at a higher power level than the initial value used by the newly added base station, the transmit power of both base stations remains at a constant but different value. Thus two base stations in equally advantageous positions with respect to a remote unit may be providing the traffic channel signal at two different absolute power levels. From a system perspective, such unbalanced operation induces undue interference to other remote units from the base station transmitting the highest signal.

Also even though the two traffic channels have different values, if the base stations are equal advantageously positioned to service the remote unit, the pilot signal strength of each base station is the same as measured by the remote unit. In the remote unit, combining occurs based on the relative signal strength of the pilot signals. The combining process operates in a suboptimal fashion when it combines the unequally powerful traffic channel signals based on equally powerful pilot signals Also for the reasons noted above, it is important that the relative power transmitted by each sector is properly controlled so that the handoff boundaries remain properly aligned between the base stations. Balancing is accomplished by the process of "base station breathing." During the process of base station breathing as detailed in above mentioned U.S. Pat. No. 5,548,812, the total output power of a base station is controlled based on the total received power. Because the breathing process operates on the aggregate output power of the base station, the 'absolute value' produced by the power control mechanism for any one traffic channel is only an estimate of the level actually transmitted by the base station. Due to the overriding effect of breathing, the same 'absolute value' returned by the power control mechanism reflects different actual transmit power levels over time depending on the loading of the base station.

Another disadvantage of this system is that an expansive communication system may comprise base stations having a variety of different maximum signal levels. For example, a large base station may be capable of transmitting at a total of 20 Watts while smaller base stations providing service to smaller coverage areas may transmit only 1 Watt or a fraction of a Watt. Thus the system of calculation generating 'absolute' levels becomes even more ambiguous.

The more advantageous scheme of the present invention avoids the disadvantages of the prior art scheme by centralizing the power control mechanism to provide uniform power control relative to the pilot signal strength throughout the system.

As noted above, the power of the aggregate forward link CDMA signal transmitted from each base station is a function of the number and relative power of the signals that are combined to create the aggregate forward link signal. For example the aggregate forward link signal may comprise a paging channel, a pilot signal, a sync channel and a plurality of traffic channels. Therefore, each sector in the system has an independent aggregate signal strength based on the number and relative signal strength and data rate of each signal that it transmits. In the preferred embodiment, each modulation element generating a forward link signal outputs a digital signal indicative of the signal level it is providing. The output indication of each modulation element is added to the others. In this way an indication of the aggregate signal level is created. A method and apparatus for creating a forward link gain signal indicative of an aggregate signal strength are detailed in U.S. Pat. No. 5,715,526, entitled "APPARATUS AND METHOD FOR CONTROLLING TRANSMISSION POWER IN A CELLULAR COMMUNICATIONS SYSTEM" issued Feb. 3, 1992 assigned to the assignee of the present invention.

In such a power control scheme, it is simple to set the power of each traffic channel signal relative to the pilot signal transmitted from that base station. For example, if the base station is provided with a ratio of traffic channel gain ($G_{Tc}$) to pilot channel gain ($G_{pilot}$), the base station merely takes the ratio that it is given and multiplies it times the pilot channel power to produce the calculated value of the traffic channel power. Thus the base station does not execute a power control algorithm but merely multiplies the ratio times the pilot signal power it is transmitting.

In the present invention, the centralized power control is controlled by the RLM. The RLM executes the power control calculation system. Referring again to FIG. 4, each base station in operating region 36 with which remote unit 10 has established a traffic channel sends to selector 24 a packet corresponding to each frame. The packet comprises the rate set currently being used, a sequence number for aligning data from multiple base stations, and the data rate corresponding to the frame. If the corresponding frame is operating in rate set 1, the remote unit repeatedly sends messages comprising the FER. If the corresponding frame is operating in rate set 2, the EIB is included.

If the remote unit is operating in rate set 1, selector 24 passes the FER information to RLM 22. RLM 22 executes the forward link power control calculation system and produces one result per frame. The result per frame is the desired ratio of $G_{Tc}/G_{pilot}$. The desired ratio is transmitted to the base stations having established communication with remote unit 10. The FER measurements made by the remote unit are actually an average of the FER over a set of frames. Therefore an inherent delay lurks in such a power control system.

If the remote unit is operating in Rate Set 2, selector 24 passes the EIB information to RLM 22. RLM 22 executes the forward link power control calculation and produces one result per frame. The result per frame is again the desired ratio of $G_{Tc}/G_{pilot}$. The resultant ratio is transmitted to the base stations having established communication with remote unit 10. The EIB is sent from the remote unit on a frame by frame basis. Therefore the inherent delay of the FER measurement is eliminated. Another advantage of the EIB is that it is only one bit in length and therefore allows for more efficient bit allocation within the packets.

An advantage of the present invention is that the capacity of the overall system can be controlled. The selected minimum operating FER also sets the capacity of the system. If higher FER rates are used, the same system can accommodate more users hence higher capacity than if lower FER rates are used. Because the FER of the system is centrally controlled, the FER of the entire system can be controlled by changing the system of calculation used by the RLM. In this manner during periods of high traffic, the corresponding FER in the area can be temporarily increased to accommodate more users at the expense of the signal quality of all users.

Also, using the present invention it is simple to change the operating point of one base station with respect to the others. For example, due to poor network planning, a base station may not provide the desired coverage area. Or a base station can be temporarily disadvantaged, for instance, if an antenna of the base station is damaged. The $G_{Tc}/G_{pilot}$ could be increased as compared to surrounding base station to increase the relative performance of the base station and to lower the reliance on the signal from surrounding base stations at the remote unit.

Another great advantage of the present invention is that the gain of each frame can be individually adjusted. Suppose the relative importance of a frame is much greater than the other frames in a sequence. For example, if one frame comprises an indication of a hard handoff to an alternate system, it is imperative that the remote unit receive the message or the connection may be dropped. It may be advantageous to increase the relative power at which such a message is supplied to the remote unit to ensure reception. In the present invention, increasing the power for a specific frame or set of frames is relatively easy. The RLM increases the ratio of $G_{Tc}/G_{pilot}$ corresponding to the critical frames and returns the ratio of $G_{Tc}/G_{pilot}$ to a normal operating level upon completion of the critical frames.

When each base station is transmitting the traffic channel at the same relative level as compared to the pilot signal that it is transmitting, the problem of equally advantageously positioned base stations providing different signal levels to the remote unit is eliminated. It also solves the problem of suboptimal combining within the remote unit because the traffic channel and pilot channel gains have a constant ratio from base station to base station. The processes of breathing and blossoming also merge well with the present invention because both breathing and blossoming operate on the aggregate transmit power of the base station thus leaving unaltered the ratio of the traffic channel to the pilot channel gain.

Centralized power control is also greatly advantageous to the reverse link power control operation. FIG. 2 shows a typical configuration in which base stations 362, 364, and 368 supply frames of vocoder data to selector 372. In the preferred embodiment, FIG. 4 incorporates the details shown in FIG. 2. In FIG. 4 the process of selection is executed by selector 24 which in the preferred embodiment is in accordance with above mentioned U.S. patent application Ser. No. 08/519,670.

Each base station with which remote unit 10 is in communication provides to selector 24 for each frame a data packet comprising the estimated data rate, the estimated data, and a confidence factor. Selector 24 chooses the frame with the highest confidence factor and passes it to a vocoder. Selector 24 discards the rest of the estimated data it receives. The error rate at the output of selector 24 is calculated. Because when the remote unit is in soft handoff there is more than one base station providing data to the selection process, the input FER from each individual base station can greatly exceed the desired resultant FER at the output of the selection process. For example, in a typical CDMA system, if there are three base stations supplying frames to the selection process, each base station can have an FER as high as 30% and still yield a desired 1% FER at the output of the selection process. Typically the FER from each base station is different from the others in that the base station receiving the remote unit signal at the most favorable Eb/No exhibits the lowest average FER.

The power control on the reverse link is set by the transmit power level of the reverse link signal from the remote unit as controlled by each base station with which the remote unit is in communication. Each base station combines the multipath signals that it receives. If the base station is capable of softer handoff, the base station also may combine the signals from different sectors to form one signal for input into a decoder. The decoder receives the aggregate demodulated data and attempts to determine the data rate at which the signal was encoded by the remote unit, an estimate of the actual data, and a confidence factor. The confidence factor reflects the confidence with which the decoder chooses the estimated data. More information on the operation of such a decoder can be found in U.S. Pat. No. 5,566,206 entitled "METHOD AND APPARATUS FOR DETERMINING DATA RATE OF TRANSMITTED VARIABLE RATE DATE IN A COMMUNICATIONS RECEIVER," issued Oct. 15, 1996, and assigned to the assignee of the present invention.

At the output of the decoder at each base station, an FER can be calculated. The prior art reverse link power control loop compares the FER to a threshold on a frame by frame basis. If the FER exceeds the threshold FER, the base station sends the remote unit a command to increase its transmit power level. If the FER is lower than the threshold FER, the base station sends the remote unit a command to decrease its transmit power level. The remote unit increases its transmit signal level only if every base station with which the remote unit is in communication requests an increase in power level. The remote unit decreases its transmit signal level if any base station with which the remote unit is in communication requests a decrease in power level. Typically one base station with which the remote unit is communicating has the most advantageous path to the remote unit. The other base stations are likely to be continually requesting an increase in power level from the remote unit. When the most advantageously connected base station requests an increase along with the others, the remote unit increases its transmit power. Therefore, during normal handoff operation, the most advantageously connected base station is the base station that actually controls the output power of the remote unit.

Like the forward link prior art mechanism, in the prior art reverse link power control mechanism the threshold FER comparison value is controlled by RLM 22. RLM 22 sends each base station a command to either increase or decrease the value of the threshold it is using based on the aggregate FER at the output of the selection process. Like the forward link prior art power control mechanism, even if each base station is operating using the same algorithm, the threshold values can differ from base station to base station because the base stations do not begin operation of the calculation system at the same time nor are they linked together in any way to unify the threshold values. Therefore, two base stations receiving a remote unit signal with equal PER may be comparing the FER to different thresholds. The base station comparing the remote unit signal to the higher FER threshold is the base station actually controlling the remote unit power level. The base station with the lower FER threshold may be continually commanding the remote unit to increase its transmit power level but the remote unit does not act upon these commands so long as at least one other base station does not request an increase in transmit power level. As long as the aggregate FER at the output of the selection process is acceptable, the RLM does not change in the threshold value at either base station.

The problem with such a configuration occurs when the base station with the higher FER threshold that is actually controlling the power level of the remote unit to the proper level loses contact with the remote unit. The base station that is using the lower FER threshold now begins to control the operation of the remote unit. Thus the remote unit begins to increase its transmit power. However, typically the increase in power is unneeded because the remote unit is already operating to produce the proper FER at the output of the selector. Thus the remote unit increases its transmit power unduly until the RLM threshold control loop senses the undue decrease in FER and increases the FER threshold at all base stations including the offending base station. Until the FER threshold is increased and the reverse link power control loop responds, the remote unit is causing undue interference to, and hence higher error rates from, the other remote units operating within the system. If the threshold at the offending base station is quite high compared to the desired threshold FER, the response time of the loop can have a significant duration. Such suboptimal power control operation decreases the overall capacity of the system.

To alleviate this problem, the present invention again moves the power control mechanism to the RLM. In the preferred embodiment, RLM 22 calculates the aggregate FER at the output of the selection process. The aggregate FER is input into a system that calculates an absolute reverse threshold value to be used by each base station with which active communication with remote unit 10 is established. Again the reverse threshold value can be forwarded on a frame by frame basis. Note that the information forwarded to selector 24 and RLM 22 is the same in the prior art implementation and the present invention. Another advantage of the present invention is that the capacity of the overall system can be controlled. The selected minimum operating FER also sets the capacity of the system. If higher FER rates are used, the same system can accommodate more users hence higher capacity than if lower FER rates are used. Because the FER of the system is controlled by the system of calculation, the FER of the entire system can be controlled by changing the system of calculation used by the RLP. In this manner during time of high traffic, the corresponding FER in the area can be temporarily increased to accommodate more users at the expense of the signal quality of all users.

The base stations may calculate an FER of the decoded frames from the remote unit and compare the result to a reverse threshold provided in terms of an absolute FER.

Notice, however, that the absolute reverse threshold need not take the form of an FER threshold. For example, in the preferred embodiment, the reverse threshold is the ratio of the energy in a demodulated Walsh symbol produced by the corresponding remote unit and the total power spectral density on the RF channel. Any measure of reverse link performance could be used.

If each base station in the system is operating using the reverse threshold and communication between one of the base stations is lost, the remaining base station immediately begins to provide valid power control commands to the remote unit. In this way, suboptimal power control does not result and the overall capacity of the system is maintained.

Another advantage is that as new base stations begin communication with the remote unit, the proper operating level is forward directly to those base stations. In the prior art method, there is an inherent delay between the time that a new base station begins to communicate with the remote unit and the time that the base station has tracked onto the proper reverse threshold at which the reverse link should operate. In the present invention the absolute and proper value is transferred to the remote unit immediately when operation is begun.

The elegance of centralized power control becomes even more apparent when intersystem operation is attempted. Referring again to FIG. 4, operating region 38 represents a second system. Operating region 38 may be operated by a different carrier. Operating region 38 may be comprised of equipment manufactured by a different company and operating in a different manner than the equipment of operating region 36.

Operating region 38 is comprised of a number of base stations only two of which are shown in FIG. 4 as base stations 18 and 20. CDMA interconnect subsystem (CIS) 8 provides an interconnection mechanism between the base stations of operating region 38 and a bank of selectors as well as other devices that are not shown in FIG. 4. In particular CIS 8 provides a connection between the base stations that may establish a connection with remote unit 12 and selector 28 that may process the call signal corresponding to remote unit 12.

When remote unit 12 has established an active traffic channel communication through only base station 18, base station 18 passes decoded frame data to selector 28 through CIS 8. Selector 28 comprises a vocoder that converts the vocoded frames into pulse code modulated (PCM) data and passes the PCM data to switch 34. The data packets from base station 18 arriving at selector 28 may also comprise information about the radio wireless link between base station 18 and remote unit 12. Selector 28 passes information about the wireless link to radio link manager (RLM) 26.

PCM encoded data is passed from switch 34 to selector 28. The PCM data is converted to vocoded frame data within selector 28. The vocoded frames are passed to base station 18 though CIS 8. RLM 26 may append radio link control data to the vocoded frames.

Remote unit 12 operates in the same manner as remote unit 10 which in the preferred embodiment may be in accordance with either IS-95, J-Standard 8, IS-95-A or other standard. Remote unit 12 may be a vehicle based telephone, a hand-held portable unit, a PCS unit, or a fixed location wireless local loop unit or any other conforming voice or data communication device.

When operating solely within region 38, RLM 26 controls the air interface between remote unit 12 and whichever base stations have established active communication with remote unit 12. Again one of the main functions of RLM 26 is to control the operation of both the forward and reverse link power control functions.

Intersystem operation begins when remote unit 12 is in active communication with base station 18 of operating region 38 and approaches operating region 36. As remote unit 12 enters the coverage area of base station 16, remote unit 12 notifies base station 18. At this point, in an ideal system, remote unit 12 enters soft handoff between base station 16 and base station 18. However, soft handoff between base stations of different operating regions presents some difficulties.

The first difficulty is that CIS 8 is not connected directly to base station 16. This difficulty can be overcome by one of several methods. EIA/TIA/IS-41C entitled "Cellular Radio Intersystem Operations" commonly referred to as IS-41. IS-41 defines a standard for communication between switches of different operating regions to support hard handoff. IS-41 does not currently provide a protocol for supporting intersystem soft handoff. In one embodiment, the necessary information from remote unit 12 may be passed from base station 16 to CIS 6 through selector 24 to switch 32. From switch 32 the information is passed to switch 34 using an IS-41 type connection or other connection. From switch 34, the information can be passed to selector 28. A reverse path mirroring the just described path carries the information from selector 28 back to base station 16 for transmission to remote unit 10. The protracted nature of the switch-to-switch connection may cause undue delay and may sacrifice undue resources.

Figure 5:
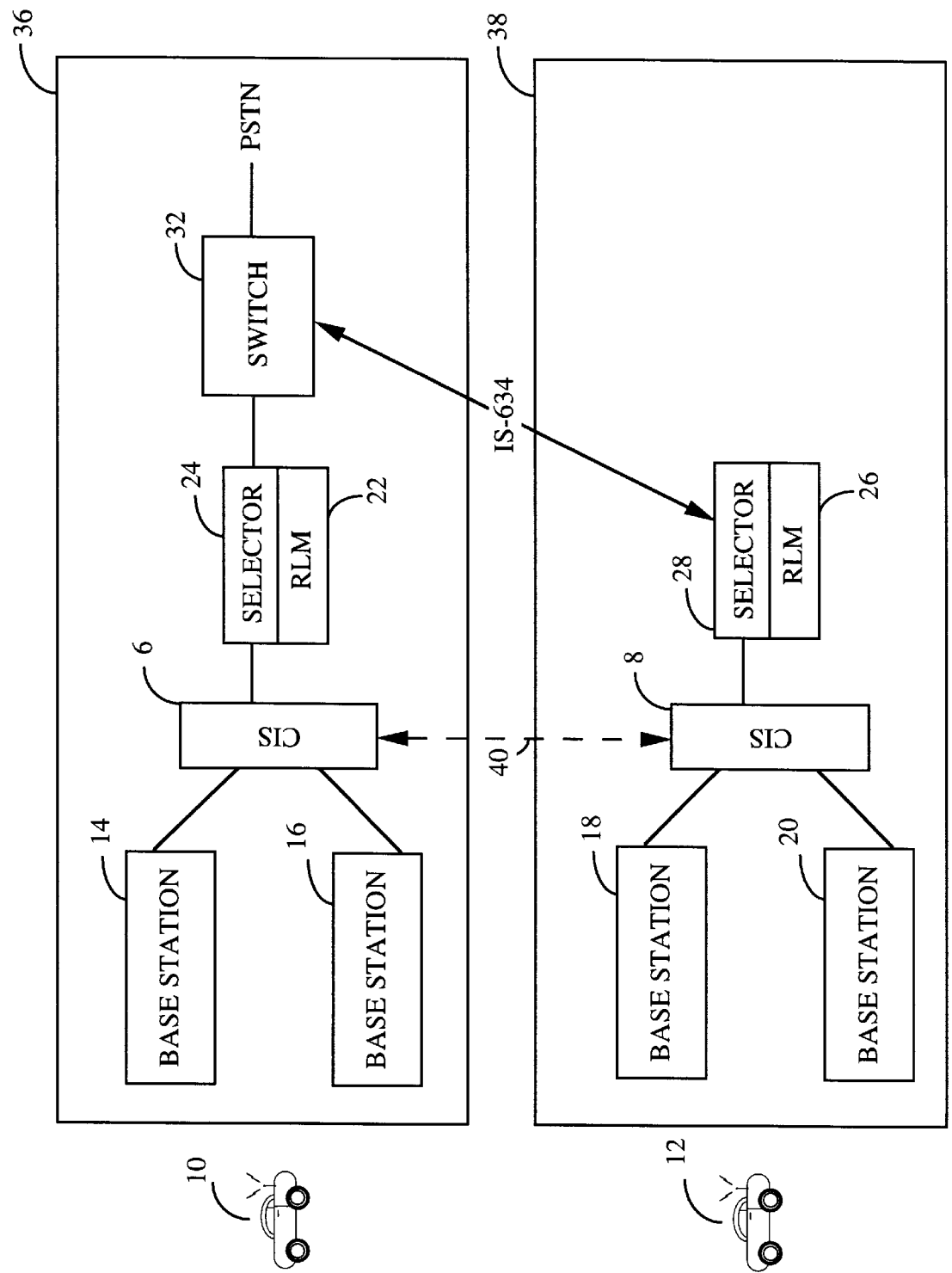
FIG. 5 shows an exemplary CDMA communication system comprised of two different operating regions both controlled by the same switch.
Figure 6:
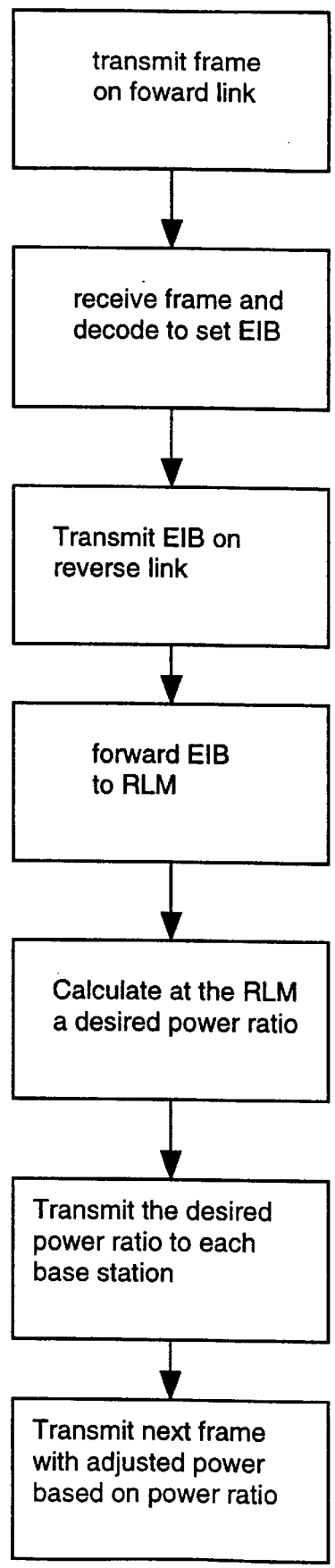
FIG. 6 shows an exemplary method of forward traffic power control.

A second connection method is illustrated in FIG. 5. EIA/TIA/IS-634 entitled "MSC-BS Interface for Public 800 MHz", generally referred to as IS-634, provides a standard of connection between operating regions and supports soft handoff. An exemplary embodiment of an IS-634 connection is shown in FIG. 5. In FIG. 5 like reference designators are used to refer to like elements shown in FIG. 4. Switch 34 has been eliminated and switch 32 is providing the connection between the base stations of operating region 38 to the PSTN and the connection between the base stations of operating region 36 and the PSTN.

A third more efficient manner to achieve connection of base station 16 to selector 28 is to connect CIS 6 to CIS 8. Connection 40 between CIS 6 and CIS 8 is also shown in FIG. 5. This connection while convenient is not an effective industry solution because the architectures used by different systems can differ greatly. A connection like connection 40 is available only when the design of operating region 36 and operating region 38 are highly similar. However, if such an efficient connection is available, the principles of the present invention apply directly.

The second difficulty is that the actual method used to calculate the power control parameters may be different in the two operating regions. In the present invention only three pieces of power control information are transferred between the two systems: EIB (or FER), $G_{Tc}/G_{pilot}$, and reverse threshold. From these three pieces of information, any of several methods can be used to control the power control loops. Notice that the prior art values can be obtained by integrating over time the parameters transferred between the two systems in accordance with the power control protocol of the present invention.

For example, returning again to the example above as remote unit 12 enters the coverage area of base station 16, assume that operating region 38 is using a method of power control modeled after the prior art methods. Also assume that remote unit 12 is operating using the Rate Set 2. In such a case to control the forward link power control loop, RLM 26 sends turn-up and turn-down threshold indications to the base stations under its control without knowing the threshold that each base station is using and remote unit 12 sends an EIB with each frame. Because operating region 36 is operating in accordance with the power control protocol of the present invention (and regardless of whether operating region 36 is operating with the centralized power control), RLM 26 receives from base station 16 through the IS-634 link the EIB indication. RLM 26 can calculate the corresponding $G_{Tc}/G_{pilot}$ value for base station 16 using an analogous or a different calculation system as used by the base stations of operating region 38. RLM 26 then forwards the $G_{Tc}/G_{pilot}$ value to CIS 6 over the IS-634 link.

If operating region 36 is using a power control mechanism in accordance with the present invention, base station 16 can use the $G_{Tc}/G_{pilot}$ value directly to set the power level of the corresponding forward link traffic channel. If operating region 36 is using a power control mechanism in accordance with the prior art method, base station 16 is expecting a command indicating whether it should increase or decrease the power level of the signal that it is transmitting to remote unit 12. In this case, either base station 16 or RLM 22 simply compares the last $G_{Tc}/G_{pilot}$ value to the current $G_{Tc}/G_{pilot}$ value and generates the proper increase or decrease command. In this way, the power control protocol of the present invention can facilitate operating in accordance with the prior art power control system.

Note that the analogous mechanism can take place with regard to the reverse link power control. The power control protocol of the present invention works equally well if the communication takes place over the IS-634 link, IS-41 link or other link. The actual architecture, allocation of functions and the path of the communication link can be quite different between the two operating regions while still making use of the power control protocol of the present invention.

Another aspect of the power control protocol of the present invention is the actual bit allocation and format used to transfer the three pieces of data between the operating systems. The format of the data must be consistent between operating systems and therefore should be standardized by the telecommunications industry. IS-634 provides the mechanism by which uniform inter-system communication is defined.

Typically the operating regions are connected by a DSØ link which is a standard 64 kilobit per second (kbit) or 56 kbit digital channel. The DSØ link is referred to as the physical interface layer or layer 1. Each digital channel is used to support a single remote unit in soft handoff. The 64 kbit digital channels are divided into four 16 kbit subrate circuits. The 56 kbit digital channels are divided into three 16 kbit subrate channels. The subrate channels are multiplexed on to the digital channel, for example, such that each subrate channel occupies two bits out of the eight bits of the DSØ. One digital channel is used to transport data corresponding to a single remote unit from up to four different base stations with which the remote unit is in communication.

In the preferred embodiment, the layer 2 frame structure occupies 320 bits. The first 16 bits designate a flag. The flag is used to mark the beginning of a frame of data. In the preferred embodiment the flag value is 06B9 in hexadecimal. The next set of bits is the information field. The number of information bits in the information field varies as a function of the rate set and the data rate as explained fully below. Following the information field is the frame check sequence. The frame check sequence consists of the standard LAP frame check sequence. LAP stands for Link Access Procedure, which is used in layer-2 for data link establishment, frame alignment, frame sequencing, flow control, and frame error detection and retransmission. The LAP Frame Check Sequence (FCS) is usually a Cyclical Redundancy Check (CRC) that covers the entire LAP Frame (i.e., everything between the start flag and the FCS itself). Finally a set of fill bits are used to complete the 320 bits of the layer 2 frame. Table II shows the number of fill bits per frame for the four possible data rates for both the forward and reverse layer 2 frames and an erasure indication and an idle indication for the reverse layer 2 frames. An "idle" occurs when a base station has been commanded to decode the information signal from a remote unit but has yet to acquire the remote unit signal.

TABLE II

| Rate Set | Transmission Rate (bps) | No. of Layer 2 Fill Bits | No. of Zero Fill Bits | No. of Sync Pattern Bits |
|---|---|---|---|---|
| 1 | 9600 | 88 | 0 | 88 |
|  | 4800 | 184 | 96 | 88 |
|  | 2400 | 224 | 136 | 88 |
|  | 1200 | 240 | 152 | 88 |
| 2 | 14400 | 0 | 48 | 0 |
|  | 7200 | 136 | 120 | 88 |
|  | 3600 | 208 | 152 | 88 |
|  | 1800 | 240 | 176 | 88 |
| other | Erasure | 264 | 176 | 88 |
|  | Idle | 264 | 176 | 88 |

The 88 sync bits are used to aid synchronization performance for each layer 2 frame except Rate Set 2, full rate frames. The chosen value of the sync bits provides that if the sync bits are pre-pended to the flag field bits and the aggregate sequence is compared to itself, the number of bits in which the bits values agree is equal to the number of bits, 104. Ideally if the flag and pre-pended sync bits are compared to themselves offset by any number of bits, the number of bit locations in which the offset sequences agree is equal to the number of bit locations in which the offset sequence disagree. In reality, it is sufficient that the difference between the number of location in which the offset sequences agree and number of locations in which the offset sequences disagree is small compared to 104. In the preferred embodiment, a maximal length sequence of length 127 produced by the 7th degree primitive polynomial $g(x)=x^7+x^4+x^3+x^2+1$ is truncated to produce the following 88 bit sync pattern sequence:
0011000011110111110101101010011011001110110111010010010110001110010000101110000011010000.

The variable length information field comprise the information in accordance with the present invention. The information bits are referred to as the layer 3 information. The preferred embodiment of the layer 3 information is shown in Table III. Column 2 of Table III illustrates the bit format for a forward link, Rate Set 2, full rate frame. Column 1 of Table III illustrates the bit format for all other forward link frames. Column 4 of Table III illustrates the bit format for a reverse link, Rate Set 2, full rate frame. Column 3 of Table III illustrates the bit format for all other reverse link frames.

TABLE III

| Bit | Column 1 | Column 2 | Column 3 | Column 4 |
|---|---|---|---|---|
| 1 | Forward | Forward | Reverse | Reverse |
| 2 | Sequence No. | Sequence No. | Sequence No. | Sequence No. |
| 3 | Sequence No. | Sequence No. | Sequence No. | Sequence No. |
| 4 | Sequence No. | Sequence No. | Sequence No. | Sequence No. |
| 5 | For. Gain Ratio | For. Gain Ratio | Clk Adjust | Clk Adjust |
| 6 | For. Gain Ratio | For. Gain Ratio | Clk Adjust | Clk Adjust |
| 7 | For. Gain Ratio | For. Gain Ratio | Clk Adjust | Clk Adjust |
| 8 | For. Gain Ratio | For. Gain Ratio | Clk Adjust | Clk Adjust |
| 9 | For. Gain Ratio | For. Gain Ratio | Clk Adjust | Clk Adjust |
| 10 | For. Gain Ratio | For. Gain Ratio | Reserved | Reserved |
| 11 | For. Gain Ratio | For. Gain Ratio | Reverse Qual. | Reverse Qual. |
| 12 | For. Gain Ratio | For. Gain Ratio | Reverse Qual. | Reverse Qual. |
| 13 | Rev. $E_W/N_T$ | Rev. $E_W/N_T$ | Reverse Qual. | Reverse Qual. |
| 14 | Rev. $E_W/N_T$ | Rev. $E_W/N_T$ | Reverse Qual. | Reverse Qual. |
| 15 | Rev. $E_W/N_T$ | Rev. $E_W/N_T$ | Reverse Qual. | Reverse Qual. |
| 16 | Rev. $E_W/N_T$ | Rev. $E_W/N_T$ | Reverse Qual. | Reverse Qual. |
| 17 | Rev. $E_W/N_T$ | Rev. $E_W/N_T$ | Reverse Qual. | Reverse Qual. |
| 18 | Rev. $E_W/N_T$ | Rev. $E_W/N_T$ | Reverse Qual. | Reverse Qual. |
| 19 | Rev. $E_W/N_T$ | Rev. $E_W/N_T$ | Set 2, Full Rate | Set 2, Full Rate |
| 20 | Rev. $E_W/N_T$ | Rev. $E_W/N_T$ | EIB | EIB |
| 21 | Set 2, Full Rate | Set 2, Full Rate | Other Rate Info. | Reserved |
| 22 | Other Rate Info. | Information | Other Rate Info. | Information |
| 23 | Other Rate Info. | . . . | Other Rate Info. | . . . |
| 24 | Other Rate Info. | . . . | Other Rate Info. | . . . |
| 25 | Information | . . . | Information | . . . |
| . . . | . . . | . . . | . . . | . . . |
| . . . | . . . | . . . | . . . | . . . |
| . . . | Layer 3 Fill | . . . | Layer 3 Fill | . . . |
| . . . | . . . | . . . | . . . | . . . |

The first bit of each of the four types of frames indicates whether the packet is a forward packet or a reverse packet. Having the forward/reverse indication first allows for immediate processing of the packet before the entire packet arrives. The next three bits are the sequence number that is used to time align the frames. The sequence number is the CDMA system time, modulo 8. The sequence number corresponds to the transmission time of the CDMA frame over the air. Having the sequence number second allows alignment, and assignment to a proper storage location in which to wait on other frames corresponding to the sequence number. The early position of the sequence number also allows the whole packet to be disregarded if it has arrived too late.

The next eight bits, bits 5–12, of the forward link frames are the ratio of $G_{Tc}/G_{pilot}$ referred to as the Forward Traffic Channel Gain Ratio. The Forward Traffic Channel Gain Ratio is calculated as:

Forward Traffic Channel Gain Ratio=Min ($\lfloor (A_f/A_p)*128 \rfloor$,255)

where $A_f$=the full-rate Forward Traffic Channel gain;

$A_p$=the Pilot Channel gain;

$\lfloor X \rfloor$=the largest integer less than or equal to X; and

Min (X,Y)=whichever one of X or Y has a smaller value.

The next eight bits, bits 13–20, in the forward frames are the Reverse Traffic Channel $E_W/N_T$. The reverse threshold is specified as $E_W/N_T$ where $E_W$ is the ratio of the total demodulated Walsh symbol energy and $N_T$ is the total received power spectral density on the RF channel. The Reverse Threshold $E_W/N_T$ field has a range of 0 to 255 in units of 0.1 dB corresponding respectively to 0 to 25.5 dB.

Bit location 21 indicates whether the traffic channel information corresponds to Rate Set 2, full rate. If the traffic channel information corresponds to Rate Set 2, full rate, the traffic channel information begins with bit 22 as shown in Column 2. If the frame is not Rate Set 2, full rate, the next three bits designate which of the remaining data rates has been used to encode the data as shown in Table IV. Starting with bit location 25, the actual traffic channel information begins.

TABLE IV

| Rate Set | Data Rate Name | Other Rate Info. Value |
|---|---|---|
| 1 | full | 100 |
|   | half | 101 |
|   | quarter | 110 |
|   | eighth | 111 |
| 2 | half | 001 |
|   | quarter | 010 |
|   | eighth | 011 |

Note that Column 2 of Table III is used only for Rate Set 2, full rate frames as indicated by bit 21. The rate set is chosen as the result of service negotiation when the connection is established. After the connection has been established, the rate set is very rarely changed. If the rate set is changed during communication, the rate change is the result of service re-negotiation. In an alternative embodiment because the rate set is fixed and known, the rate set designation is not sent within each frame in the interest of bit efficiency.

Finally a set of layer 3 fill bits are used to complete the layer 3 frame. Table V shows the number of layer 3 fill bits per frame for the four possible data rates of each rate set for the forward direction.

TABLE V

| Rate Set | Transmission Rate (bps) | No. of Fill Bits Per Layer 3 Frame |
|---|---|---|
| 1 | 9600 | 4 |
|   | 4800 | 0 |
|   | 2400 | 0 |
|   | 1200 | 0 |
| 2 | 14400 | 0 |
|   | 7200 | 3 |
|   | 3600 | 1 |
|   | 1800 | 3 |

The Forward Traffic Channel Information is the information that is sent from the base stations to the remote unit. In the preferred embodiment, in accordance with IS-95 or IS-95A, the information bits are supplied from the multiplex option sublayer. IS-95 and IS-95A also specify the bit order within the information.

The first four bits of the reverse frames shown in Columns 3 and 4 are the same as the forward link frames. Bits 5 through 9 are the Fine Clock Adjust. The Fine Clock Adjust specifies the desired change in time that forward direction layer 2 frames should arrive at the base stations in units of 125 microseconds ($\mu$sec). Positive values of the Fine Clock Adjust request that the frames arrive earlier in time while negative values indicate that the forward direction layer 2 frame should arrive later in time. The following bit, bit 10, is reserved for future designation.

The next eight bits, bit 11–18, indicate the Reverse Traffic Channel Quality. Seven of the eight bits are used to specify the symbol error rate as calculated by the base station and one is a CRC calculated by the base station. The symbol error rate and CRC are used by the selection process to choose the most advantageous reverse link frame for subsequent processing. If the reverse frame has an associated CRC and the CRC passed, the base station sets bit 11 to '1.' If the frame CRC fails or if the frame is not associated with a CRC, the base station sets bit 11 to '0.' The symbol error rate occupies the next seven bits, bits 12–18. The binary value of the symbol error rate is calculated as:

$$127-\lfloor\min(\text{Re-Encoded Symbol Error Rate}*\alpha, 255)/2\rfloor$$

where

Re-Encoded Symbol Error Rate=the number of errors found when comparing the receive symbols at the input of the convolutional code decoder and the re-encoded symbols at the output of the convolutional code decoder;

$\alpha=1$, for full rate frames of each rate set;

$\alpha=2$, for half rate frames of each rate set;

$\alpha=4$, for quarter rate frames of each rate set;

$\alpha=8$, for eighth rate frames of each rate set;

$\lfloor x\rfloor$=the largest integer less than or equal to X; and

Min (X,Y)=whichever one of X or Y has a smaller value. The Re-Encoded Symbol Error Rate computation includes the erasure indicator bit if applicable, the information bits, the frame quality indication if applicable and the encoder tail bits. For more information about these information bits, see IS-95. For more information on the Re-Encoded Symbol Error Rate, see the above-mentioned U.S. Pat. No. 5,566,206 entitled "METHOD AND APPARATUS FOR DETERMINING DATA RATE OF TRANSMITTED VARIABLE RATE DATE IN A COMMUNICATIONS RECEIVER."

Bit location 19 indicates whether the traffic channel information corresponds to a Rate Set 2, full rate frame. Bit 20 is the Erasure Indicator Bit. The Erasure Indicator Bit is set to '0' if Rate Set 1 is being used. When Rate Set 2 is being used, the base station sets bit 20 to '1' if the Erasure Indicator Bit received from the remote unit is '1,' otherwise the base station sets bit 20 to '0.' The following bit, bit 21, is reserved for future designation.

If the traffic channel information corresponds to a Rate Set 2, full rate frame, the traffic channel information begins with bit 22 as shown in Column 4. If the frame is not Rate Set 2, full rate, the next four bits designate which of the remaining data rates has been used to encode the data as shown in Table VI. According to IS-95, the rate determination algorithm may return an indication that a Rate Set 1, full rate frame has most likely been received. The corresponding rate indication is shown in the last row of Table VI. Starting with bit location 25, the actual traffic channel information begins.

TABLE VI

| Rate Set | Data Rate Name | Other Rate Info. Value |
|---|---|---|
| 1 | full | 0100 |
|   | half | 0101 |
|   | quarter | 0110 |
|   | eighth | 0111 |
| 2 | half | 0001 |
|   | quarter | 0010 |
|   | eighth | 0011 |
|   | Erasure | 1000 |
|   | Idle | 1001 |
|   | Set 1, Full Rate Likely | 1010 |

The Reverse Traffic Channel Information is set to the estimated information that the base station received from the remote unit. The base station includes the number of layer 3 fill bits in the information corresponding to the transmission rate to the Reverse Traffic Channel Frame. The base station sets the information bits to the information bits received from the remote unit which correspond to the multiplex sublayer as described in IS-95 and IS-95A. The number of bits at each data rate for the reverse channel is the same as the forward channel and is given in Table VII.

TABLE VII

| Rate Set | Transmission Rate (bps) | No. of Fill Bits Per Layer 3 Frame |
|---|---|---|
| 1 | 9600 | 4 |
|   | 4800 | 0 |
|   | 2400 | 0 |
|   | 1200 | 0 |
| 2 | 14400 | 0 |
|   | 7200 | 3 |
|   | 3600 | 1 |
|   | 1800 | 3 |
| other | Erasure | 0 |
|   | Idle | 0 |

Note that for packets that do not contain full rate frames, the packet format is the same whether or not the corresponding remote unit is in Rate Set 1 or 2. In the preferred embodiment, a remote unit operating under IS-95 in Rate Set 1 sends the FER data within the data payload of the packet. When the other rate information bits indicate that the reverse packet carries a Rate Set 1 frame, the EIB bit, bit 20, is simply ignored because an EIB is not associated with Rate Set 1 data.

There are many obvious variations to the present invention as presented including simple architectural changes. As noted above, the elegance of the present invention is that it can be practiced between a large variety of different operating region architectures. For example, the selection and vocoding function may be integrated into the switch. Or the vocoders may be located in a bank of resources not specifically allocated to a selector. The present invention works equally well with data connections as it does with voice connections. With a data connection, the selector uses a modem rather than a vocoder to convert the selected frame data to PCM data and to convert PCM data from the switch to frame data. For an exemplary embodiment of a data connection see U.S. Pat. No. 5,479,475 entitled "METHOD AND SYSTEM FOR PROVIDING COMMUNICATION BETWEEN STANDARD TERMINAL EQUIPMENT USING A REMOTE COMMUNICATION UNIT" issued Dec. 26, 1995.

The present invention also can be used in a variety of different communication systems. For example, the centralized power control mechanism of the present invention could easily be integrated into a system which does not use a pilot signal. Also a variety of different types of parameters could be used to perform the same functions. For example, EIB could be replaced with a single bit demodulation or decoding quality index.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a system wherein forward link frame data is transmitted from at least one active base station to a remote unit and reverse link frame data is transmitted from said remote unit to said at least one active base station, a method of providing centrally controlled power control, comprising the steps of:

transmitting a first forward link frame of data from a first active base station to said remote unit at a first power level and transmitting a pilot signal at a first base station pilot power level;

receiving at said remote unit said first forward link frame of data and decoding said first forward link frame of data to produce a first forward link estimated frame of data or an erasure bit;

transmitting from said remote unit to said first active base station an erasure indication bit indicating whether said first forward link frame of data was decoded as an erasure;

receiving at said first active base station said erasure indication bit and forwarding said erasure indication bit to a radio link manager;

calculating at said radio link manager a desired ratio of a power level of a second forward link frame of data to a pilot power level, said desired ratio being based upon a logical value of said erasure indication bit;

transmitting from said radio link manager to each of said at least one active base stations said desired ratio and said second forward link frame of data; and transmitting said second forward link frame of data at a second power level from said first active base station, wherein said second power level is equal to said first base station pilot power level times said desired ratio.

2. The method of claim 1, further comprising the step of increasing the desired ratio at the radio link manager if the second forward link frame of data is a frame of a predefined type.

3. In a system including at least one active base station in communication with a remote unit, a method of controlling power transmitted within said system, comprising the steps of:

transmitting a first forward link frame of data from a first active base station to said remote unit at a first power level and transmitting a pilot signal at a first pilot power level;

receiving at said remote unit said first forward link frame of data and producing a first forward link frame quality indication, said first forward link frame quality indication being determined based on either (1) a forward error rate associated with said first forward link frame of data, or (2) a logical value of an erasure indication bit associated with said first forward link frame of data;

transmitting from said remote unit to said first active base station said first frame quality indication;

receiving at said first active base station said first frame quality indication;

calculating at a system controller a desired ratio of a power level of a second forward link frame of data to a power level of said pilot signal based upon said first frame quality indication; and transmitting, from said first active base station, a second forward link frame at a power level determined in accordance with said first pilot power level and said desired ratio.

4. The method of claim 3, further including the steps of:

providing a power adjustment comment from said first active base station to said remote unit based on a reverse link performance level and a remote unit signal quality measurement at said first active base station; and transmitting from a second active base station said second forward link frame at a power level determined in accordance with a second base station pilot power level and said desired ratio.

5. The method of claim 3 wherein said step of producing said first frame quality indication includes the steps of:

decoding said first forward link frame of data, and setting, in a reverse link packet transmitted by said remote unit, an erasure indication bit to a predetermined logical value when said first forward link frame of data is decoded as an erasure.

* * * * *